United States Patent [19]

Strohmeyer

[11] 4,131,046

[45] Dec. 26, 1978

[54] APPARATUS FOR SEVERING A WEB

[76] Inventor: Willi Strohmeyer, Grimsehlstrasse 37, D 3352 Einbeck, Fed. Rep. of Germany

[21] Appl. No.: 847,915

[22] Filed: Oct. 27, 1977

[30] Foreign Application Priority Data

Nov. 3, 1976 [DE] Fed. Rep. of Germany ....... 2650355

[51] Int. Cl.[2] .......................... B23D 19/00; B26D 1/18

[52] U.S. Cl. ...................................... 83/471.2; 83/485; 83/488

[58] Field of Search ....................... 83/471.2, 483, 485, 83/487, 488, 489

[56] References Cited

U.S. PATENT DOCUMENTS

| | | | |
|---|---|---|---|
| 2,219,485 | 10/1940 | Neuwirth | 83/489 X |
| 2,651,366 | 9/1953 | Ide | 83/488 X |
| 3,566,932 | 3/1971 | Papenmeier | 83/471.2 |
| 4,054,072 | 10/1977 | Jagers | 83/488 |

*Primary Examiner*—Willie G. Abercrombie
*Attorney, Agent, or Firm*—Michael J. Striker

[57] ABSTRACT

An apparatus for cutting a web has a support with an upper flat surface formed with an elongated slot that extends in a cutting direction. An elongated guide is parallel to and above the support surface and extends in a direction perpendicular to the direction of displacement of a web across the surface. This guide is limitedly vertically displaceable relative to the support surface and a carriage is longitudinally displaceable along the guide by means of rollers. A wheel is journalled in the carriage for rotation about an axis perpendicular to the cutting direction and has a periphery centered on the axis and engageable through a web workpiece with the surface so as to support the wheel, carriage and guide with their weight on the support surface. A cutter disc fixed to and jointly rotatable with the wheel extends through the slot in the table so that relative displacement of the wheel and the workpiece will cause the wheel to sever the workpiece at the slot, the wheel meanwhile holding the workpiece tightly down against the table and rotating the disc.

10 Claims, 8 Drawing Figures

APPARATUS FOR SEVERING A WEB

BACKGROUND OF THE INVENTION

This invention relates to a cutting apparatus. More particularly this invention concerns an apparatus for severing an elongated web workpiece of sheet material such as floor covering linoleum, needle felt, elastomeric or synthetic-resin sheeting, textile material, or the like.

A severing device of the above-described general type is known built along the principle of a radial-arm saw, that is having a circular blade which engages in a slot of a support surface on which the material to be cut is held or displaced. This blade is driven at relatively high speed, often of the order of several thousand rpm, so that while cutting the blade does not exert any force tending to displace the workpiece on the support surface. With such an arrangement the blade can be drawn across the workpiece, or the blade can be held stationary and the workpiece pulled along under the blade.

Such a machine is relatively expensive and has the considerable disadvantage that when used with many workpieces, as for instance synthetic resins, the rapidly rotating blade heats up and damages the workpiece. In particular when cutting thermoplastic synthetic-resin material it is necessary frequently to shut down the machine and clean the blade to remove from it hardened-on synthetic-resin material which was melted onto the blade during the cutting operation.

It is also known to provide an apparatus, such as shown in U.S. Pat. No. 3,296,911 with a non-driven blade having a sharpened edge. Such an arrangement is invariably provided with a hold-down device in order to retain the workpiece flat on the table underneath the blade. The disadvantage of this system is that the hold-down device itself exerts on the workpiece a force tending to displace it on the support surface and wrinkle it. Furthermore the non-driven and usually non-rotating blade also exerts considerable force in the plane of the workpiece tending also to displace it along the table so that the cut is not exactly in the desired position. With a blade of this type, that is not driven, the cutting edge must be maintained extremely sharp in order to obtain a satisfactory cut.

It has also been suggested, as for instance in U.S. Pat. No. 3,137,192 to hold the workpiece down against the cutting surface by means of rollers biased by a spring downwardly against the support surface. Extending through a slot in the table of this device is a sharpened blade which makes the cut. Such an arrangement is disadvantageous in that, first of all, the blade must once again be maintained extremely sharp in order to obtain a clean cut. When dull the device must be taken apart so that that small area of the blade that does all of the cutting can be resharpened. What is more if a relatively thick workpiece is used the downwardly effective biasing spring is compressed to a greater extent so that the downward biasing force increases. Thus the biasing force bears a direct relationship to the workpiece thickness, which once again is undesirable in many instances.

Yet another arrangement is seen in U.S. Pat. No. 3,766,816 which has a paper cutter wherein a hold-down bar is laid on top of the workpiece to be cut adjacent a squared-off cutting edge. A combined wheel/cutter is rolled along the edge of the table, with the wheel rolling on the hold-down bar and the cutter engaging past the edge of the table. With this arrangement the provision of a hold-down bar makes the device completely unusable in an arrangement where the workpiece must be pulled past the blade, and further increases the cost of the assembly. The use of a hold-down strip is particularly bothersome in installations wherein considerable productivity is desired, as it must be painstakingly positioned before each cut and then removed after the cut is made.

SUMMARY OF THE INVENTION

It is therefore an object of the present invention to provide an improved cutting apparatus.

Another object of this invention is the provision of a cutting apparatus which overcomes the above-given disadvantages.

Yet another object is to provide a cutting apparatus which can be produced at relatively low cost, yet which will accurately and surely make a clean cut in workpieces of many different types.

These objects are attained according to the present invention in a cutting apparatus for a web workpiece wherein the workpiece is held on a support having an upper flat support surface formed with an elongated slot extending in a cutting direction. An elongated guide constituted by at least one guide rail extends generally parallel to and above the support surface at a right angle to the direction of displacement of the material across the support surface. A carriage longitudinally displaceable along the guide rail has a bearing which defines an axis substantially perpendicular to the cutting direction and non-displaceable in the carriage. A wheel is journalled in the carriage for rotation about this axis and has a cylindrical outer periphery which is centered on the axis and engageable through a web workpiece lying on the surface with this surface. Mounting means supports at least the carriage, the wheel, and the bearing means on the support surface with the periphery of the wheel so that the weight of the carriage, wheel and bearing is applied to a web workpiece lying on the support surface. A cutter disc is fixed to and jointly rotatable with the wheel and lies in a plane parallel to the cutting direction and substantially perpendicular to the axis. This disc has a cutting edge which is centered on the axis and extends radially beyond the periphery of the wheel into the slot of the surface.

Thus with the system according to the present invention the workpiece is automatically held in place on the table by the periphery of the wheel which at the same time serves to drive and rotate the cutting disc as the wheel and cutting disc rotate relative to the workpiece. Such an arrangement can be easily used in a system wherein the workpiece is stationary on the support surface and the carriage is pulled across it, or in a system wherein the carriage remains fixed while the workpiece is drawn under it. In both such situations the workpiece pinched between the periphery of the support wheel and the support surface will serve to rotate the cutting disc while the support wheel holds the workpiece snugly down against the table adjacent this disc. It is, of course, possible to provide extra weights on the carriage or spring biasing to increase the downwardly effective force.

Since the periphery of the cutting disc extends radially beyond the periphery of the wheel the cutting edge of this disc will have a greater peripheral velocity than the periphery of the wheel and, therefore, will slice very cleanly through the workpiece. Furthermore the cutting location will lie somewhat ahead of the pressing location so that any local deformation of the workpiece will not disadvantageously affect the quality of the cut.

According to yet another feature of this invention the carriage has an upper housing part carrying a plurality of upper rollers bearing downwardly on the guide rail and a lower housing part carrying a plurality of lower rollers bearing upwardly on the guide rail. Means in the form of bolts and shims or the like is provided for moving the two parts toward and away from each other in order to increase or decrease the pressure which the rollers exert on the rail, so as to tighten or loosen the carriage on the rail.

According to yet another feature of this invention the carriage is vertically non-displaceable relative to the rail and the rail is supported at each of its ends in a holder permitting at least limited vertical displacement of the rail relative to the support surface. According to this invention the rail is provided with a horizontal projection received in a recess of the holder, with play normally existing between the projection and the holder. Of course the projection could be provided on the holder and the recess on the rail with the same effect. Even when the periphery of the wheel engages the table according to this invention there is still a space between the bottom of the projection and the bottom of the holder so that the carriage rests on the support surface with its weight. The advantage of this particular arrangement is that the downwardly effective biasing force remains the same regardless of the thickness of the workpiece.

The axis may extend parallel to the guide in an arrangement wherein the workpiece is drawn under the carriage, or may extend perpendicular to the guide in an arrangement wherein the carriage is drawn across the workpiece. In an arrangement wherein the axis is parallel to the guide the support surface is formed underneath the guide by at least one block formed with the slit and horizontally displaceable across the surface underneath the blade. It is of course possible in such an arrangement to provide a plurality of such carriages along the guide with respective blocks underneath so that a workpiece can be pulled through the arrangement and slit into several strips. Means can also be provided for preventing displacement of the carriage and/or the underneath slotted blocks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
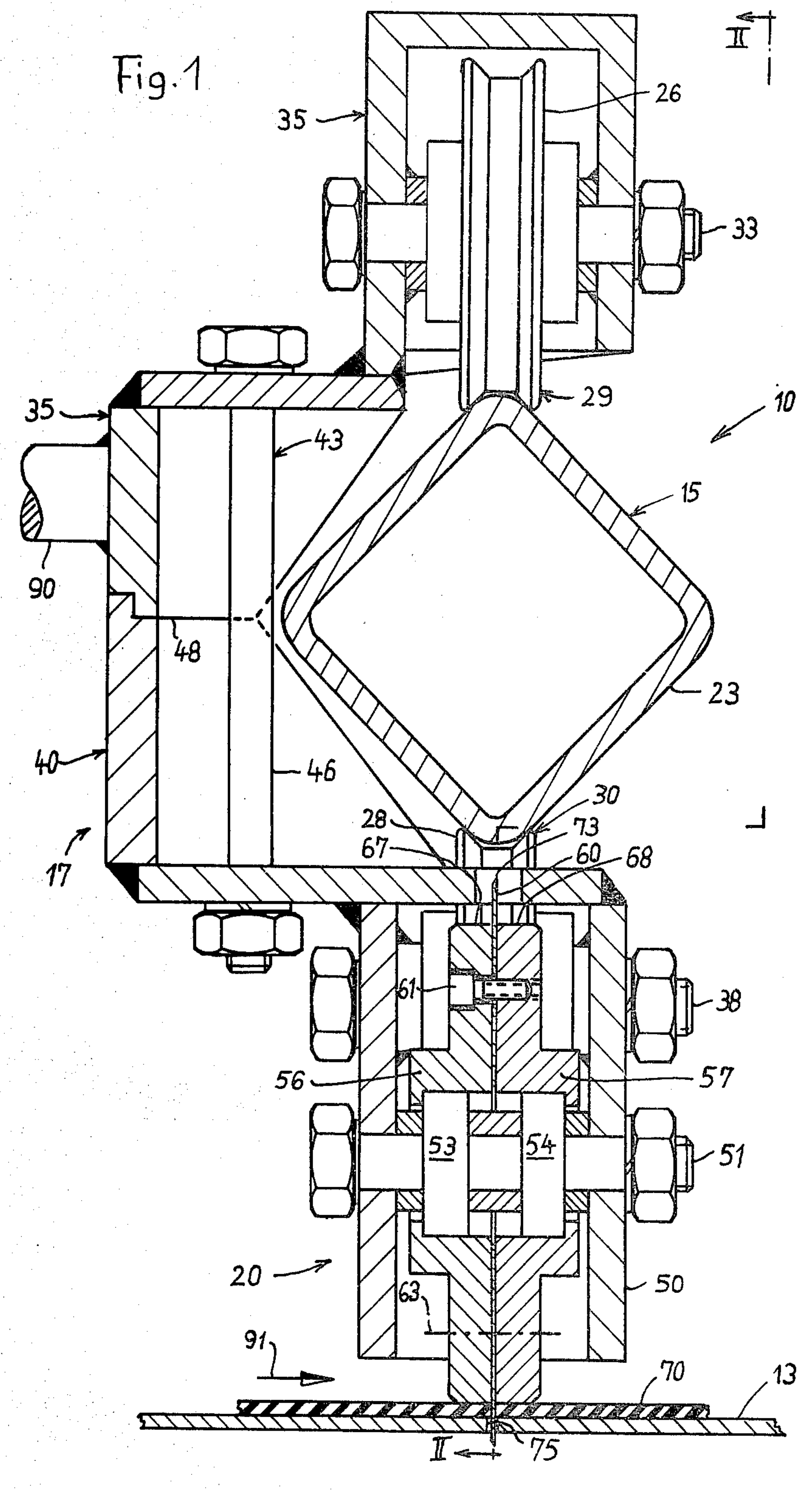
FIG. 1 is a vertical section through an apparatus according to the instant invention.
Figure 2:
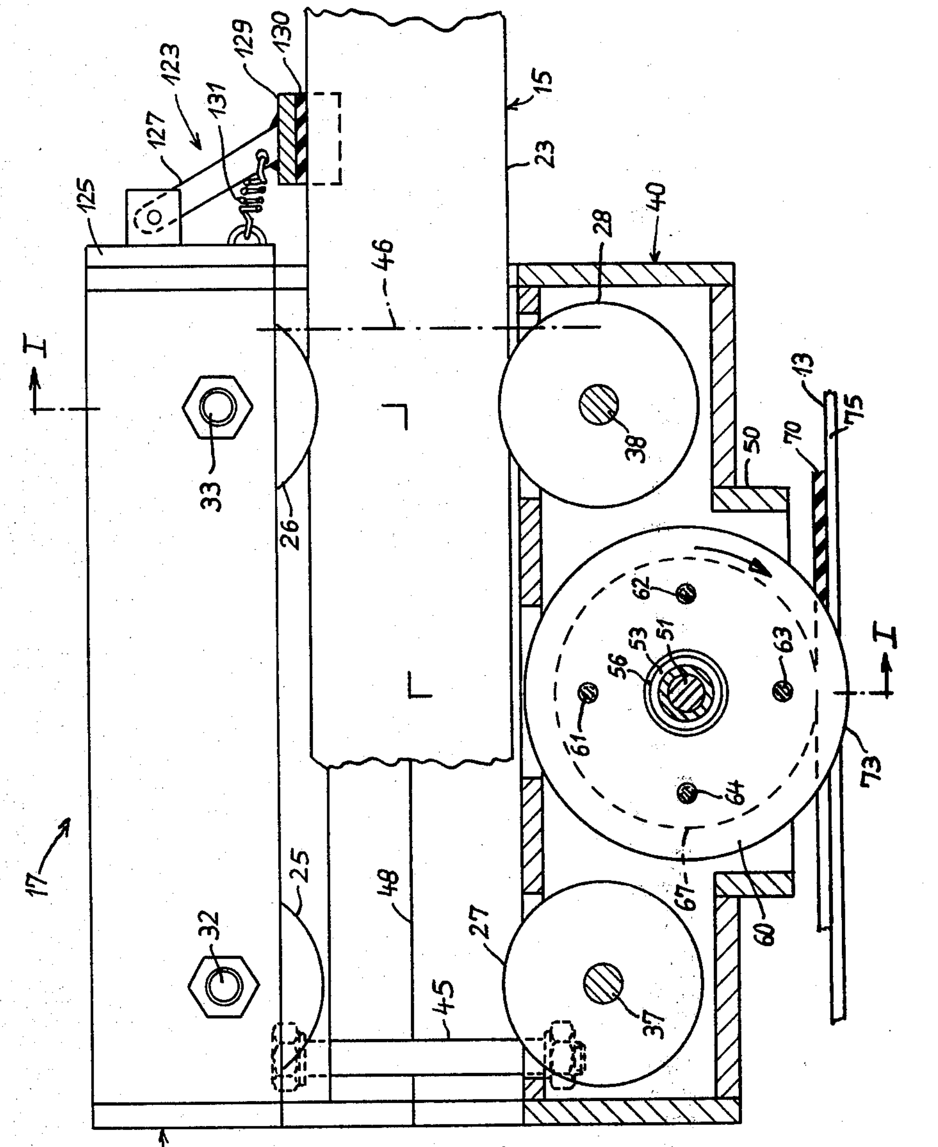
FIG. 2 is a section taken along line II—II of FIG. 1, line I—I of FIG. 2 being the section line for FIG. 1.

DESCRIPTION OF THE PREFERRED EMBODIMENTS:

As shown in FIGS. 1 and 2 a cutting machine 10 according to the present invention includes a carriage 17 horizontally displaceable along a guide 15 above a horizontal and planar support plate 13. The carriage 17 carries a cutter 20 adapted to sever a web workpiece 70, here a sheet of elastomeric material.

The guide 15 is formed as a square-section tubular guide rail 23 whose diagonal extends vertically. The carriage 17 has an upper housing part 35 carrying an upper guide-roller assembly 29 constituted as a pair of horizontally spaced upper guide rollers 25 and 26 carried on respective axles 32 and 33. The carriage further comprises a lower housing part 40 engaging the upper housing part 35 at a joint 48 and carrying a lower guide-roller assembly 30 constituted as a pair of horizontally spaced lower guide rollers 27 and 28 carried on respective axles 37 and 38. The rollers 25–28 are all formed with grooved outer peripheries which engage over the corners of the square-section rail 23 so that the carriage 17 cannot cant relative to the longitudinal axis of the rail 23. Tensioning means 43 in the form of horizontally spaced and vertically extending tensioning bolts 45 and 46 interconnect the upper and lower parts 35 and 40 so that the force with which the upper rollers 25 and 26 bear downwardly and with which the lower rollers 27 and 28 bear upwardly on the guide rail 23 can be adjusted. Normally these bolts 45 and 46 are tightened until there is no play, that is no vertical displacement possible, between the carriage 17 and guide rail 23.

The carriage 17 has a lowermost cutter housing 50 underneath the housing part 40 which is provided with a horizontally extending axle bolt 51 on which are provided a pair of axially spaced roller bearings 53 and 54 carrying respective and identical hub wheels 56 and 57 secured together on either side of a thin cutting disc 60 by means of throughgoing screws 61–64 angularly equispaced about the axis defined by the bolt 51. The hub wheels 56 and 57 have cylindrical outer peripheries 67 and 68 which lie radially inwardly of the outer periphery or cutting edge 73 of the blade 60, which itself extends downwardly through a thin slot 75 in the support plate 13. The blade 60 has a width along the axis defined by the pin 51 which is slightly less than the width of the slot 75 but exactly parallel thereto in a cutting direction.

Figure 7:
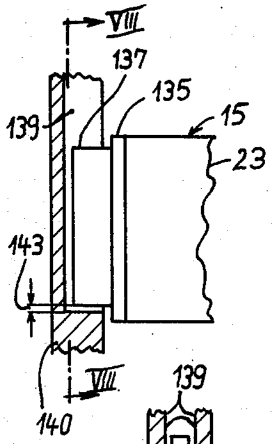
FIG. 7 is a vertical section taken through a detail of the apparatus according to this invention.
Figure 8:
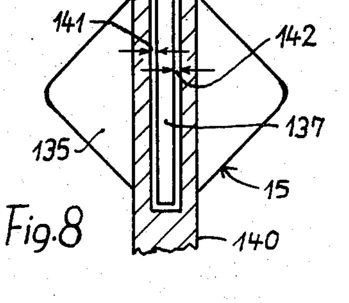
FIG. 8 is a section taken along line VIII—VIII of FIG. 7.

The ends of the rail 23 as shown in FIGS. 7 and 8 are fitted with end caps 135 from each of which axially extends a rigid vertical rib 137 of square section which is received in a vertical guide slot 139 of a guide or holder 140 fixed relative to the plate 13. Horizontal play 141 and 142 is provided to each side of the rib 137, between it and the inner walls of the groove 139. Similarly when the surfaces 67 and 68 rest on the plate 13 a small amount of vertical play 143 is provided between the lower edge of the rectangular-section rib 137 and the base of the slot 139. Thus the entire weight of the guide rail with its end caps 135 as well as all of the carriage 17 and cutter 20 bears on the support plate 13 via the peripheries 67 and 68.

Figure 3:
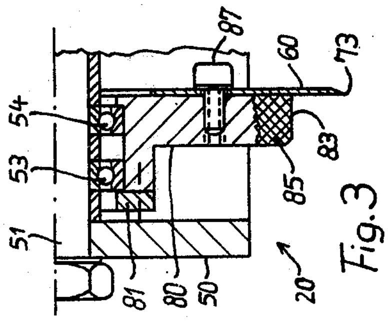
FIG. 3 is a detail view similar to FIG. 1 of a variant on the arrangement of FIG. 1.

It is possible as shown in FIG. 3 to provide a single wheel or hub 80 secured to one side of the disc 60 by means of screws 87. This single wheel 80 is held on the bearings 53 and 54 by an end ring 81 and has an outer periphery 83 formed with roughenings 85 in the form of milled or knurled formations.

In the arrangement of FIGS. 1 and 2 the carriage 7 has a handle 90 which allows the entire carriage 17 to be displaced along the rail 23 in a direction perpendicular to the direction 91 that the workpiece is displaced before a cut is made. Thus in use the workpiece is displaced in direction 91 until the desired length lies to the right as seen in FIG. 1 of the slot 75. Then the handle 90 is grasped and the entire carriage 17 and cutter 20 are pulled across the workpiece. The peripheries 67 and 68 will roll on the workpiece 70, holding it tightly down against the table with the weight of the carriage 17, cutter 20 and guide 23, while the sharp edge 73 of the blade 60 cuts through the workpiece 70.

Figure 5:
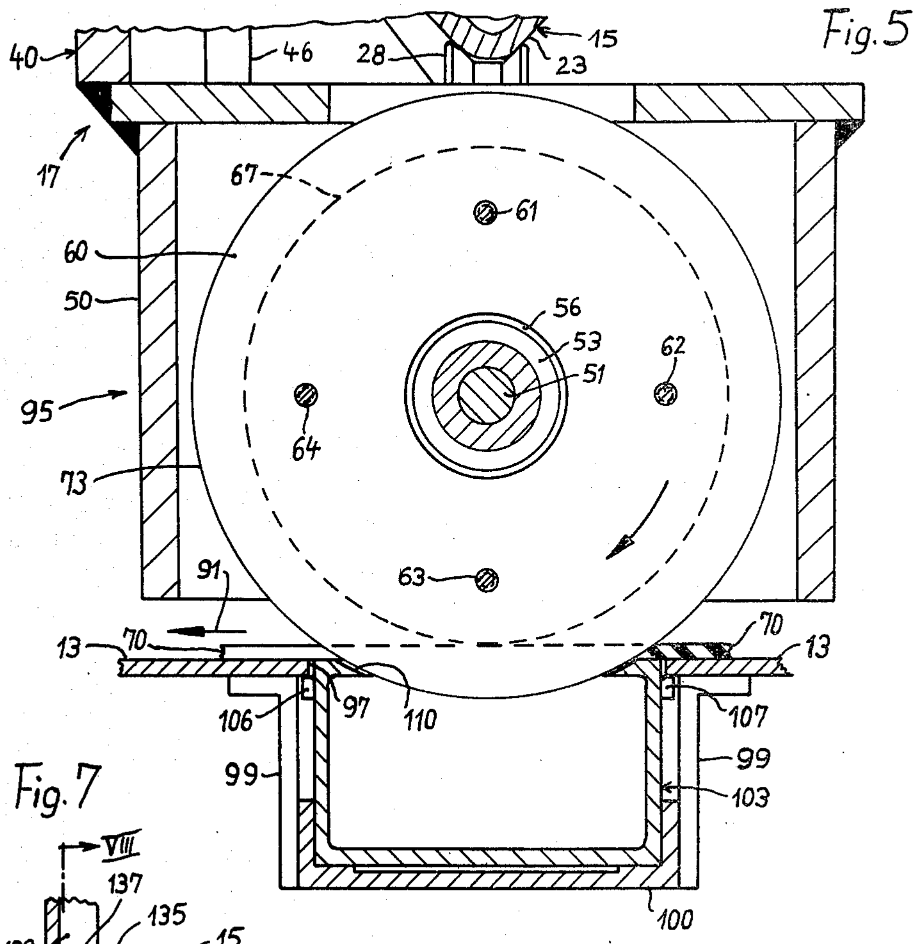
FIGS. 5 and 6 are sections taken along lines V—V and VI—VI, respectively, of FIG. 4.
Figure 4:
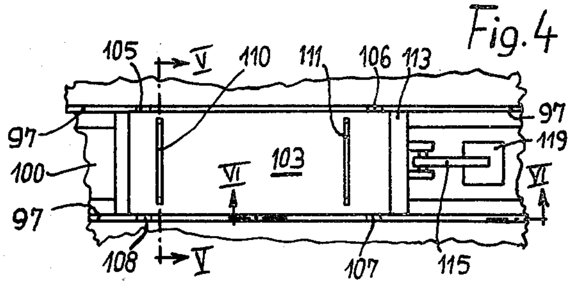
FIG. 4 is a top view of a detail of another arrangement in accordance with this invention.
Figure 6:
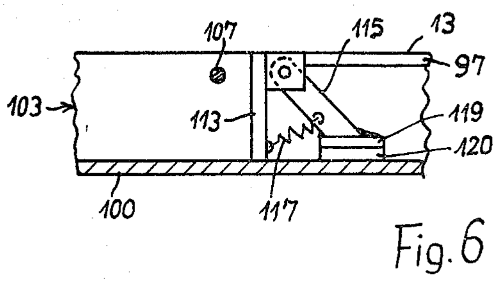

The arrangement shown in FIGS. 4–6 has a cutter 95 mounted on a carriage 17 identical to that of FIGS. 1 and 2, but here with the pin 51 extending exactly parallel to and below the rail 23. In this arrangement the support plate 13 is provided beneath the guide 23 with a relatively wide recess 97 extending completely across the plate 13 perpendicular to the direction 91. Underneath the plate 13 a plurality of holding brackets 99 support an upwardly U-shaped channel 100 which defines a guide directly parallel to the guide 23 and to the plate 13. A block 103 formed with a pair of slots 100 and 111 of the same dimensions as the slot 75 of FIG. 1 is provided in this channel or guide 100 and is supported on it with four pins 105–108 on its upper side engaging underneath the plate 13. This block or unit 103 is horizontally displaceable along the channel 100 underneath the blade 60 so that this blade 60 always extends into its groove 100.

A plurality of the carriages 17 may be provided in this arrangement on the guide 23 with each blade 60 extending into one of the slots 110 or 111 of the block 103, or with a plurality of such blocks 103, one for each of the carriages 17.

Each block 103 has an end plate 113 on which is pivoted an arm 115 carrying on its outer end a shoe 119 and biased downwardly by means of a tension spring 117 so that an elastomeric pad 120 on the bottom of the block can bear on the surface of the channel 100.

The carriage 17 has a similar such locking device 123 shown in FIG. 2 and comprising an arm 127 pivoted on a plate 125 secured to one end of the upper part 35. This arm 127 is biased downwardly by means of a tension spring 131 so that a downwardly V-shaped shoe 129 thereon can press a downwardly V-shaped elastomeric block 130 against the upper corner of the square-section guide rail 23.

In use the blocks 103 and the carriage 117 can both be displaced easily in a direction away from their respective holding shoes, and can be displaced in the opposite direction relatively easily by displacement of the respective arms upwardly to bring the shoes out of contact with the respective surfaces. Then the carriage or block 103 can be moved to the desired location and the arm released so that once again the elastomeric block presses against the respective surface and holds the respective element in place.

It will be understood that each of the elements described above, or two or more together, may also find a useful application in other types of machines differing from the types described above.

While the invention had been illustrated and described as embodied in a cutting apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for cutting a web workpiece, said apparatus comprising:
- a support having an upper flat support surface formed with an elongated slot extending in a cutting direction;
- an elongated guide generally parallel to and above said support surface;
- a carriage longitudinally displaceable along said guide;
- bearing means is said carriage defining therein an axis substantially perpendicular to said direction and non-displaceable in said carriage;
- a wheel rotatable in said carriage about said axis and having an outer periphery centered on said axis and engageable through a web workpiece lying on said surface with said surface;
- mounting means supporting at least said carriage, said bearing means and said wheel on said support surface with said periphery, whereby said carriage, said bearing means and said wheel bear with their joint weight on said surface or on a web workpiece lying thereon through said periphery; and
- a cutter disc fixed to and jointly rotatable with said wheel and lying in a plane parallel to said direction and substantially perpendicular to said axis, said disc having a cutting edge centered on said axis and extending radially beyond said periphery into said slot.

2. The apparatus defined in claim 1, wherein said guide extends substantially perpendicular to the direction of displacement of said workpiece on said surface.

3. The apparatus defined in claim 2, wherein said carriage is provided with at least one upper roller bearing downwardly on said guide and at least one lower roller bearing upwardly on said guide.

4. The apparatus defined in claim 3, wherein said housing has an upper part supporting said upper roller and a lower part supporting said lower roller, said apparatus further comprising means for displacing said upper and lower parts toward and away from each other for adjusting the pressure with which said rollers bear on said guide.

5. The apparatus defined in claim 2, wherein said carriage, wheel, bearing means and disc are substantially vertically non-displaceable relative to said guide, said mounting means including at least one holder supporting said guide for at least limited vertical displacement relative to said support.

6. The apparatus defined in claim 5, wherein said guide is a horizontal rail of substantially uniform cross-section having at least one end received in said holder, said holder having a base support surface spaced vertically below said one end with said periphery engaged with said surface, whereby said wheel bears at said periphery on said surface with the weight of said carriage, rail, disc, and bearing means.

7. The apparatus defined in claim 2, wherein said periphery is roughened.

8. The apparatus defined in claim 2, wherein two such axially aligned wheels flank said disc.

9. The apparatus defined in claim 2, wherein said periphery is cylindrical.

10. The apparatus defined in claim 2, wherein said slot has a width perpendicular to said direction only slightly greater than the width perpendicular to said direction of said disc at said periphery.

* * * * *